2,411,624

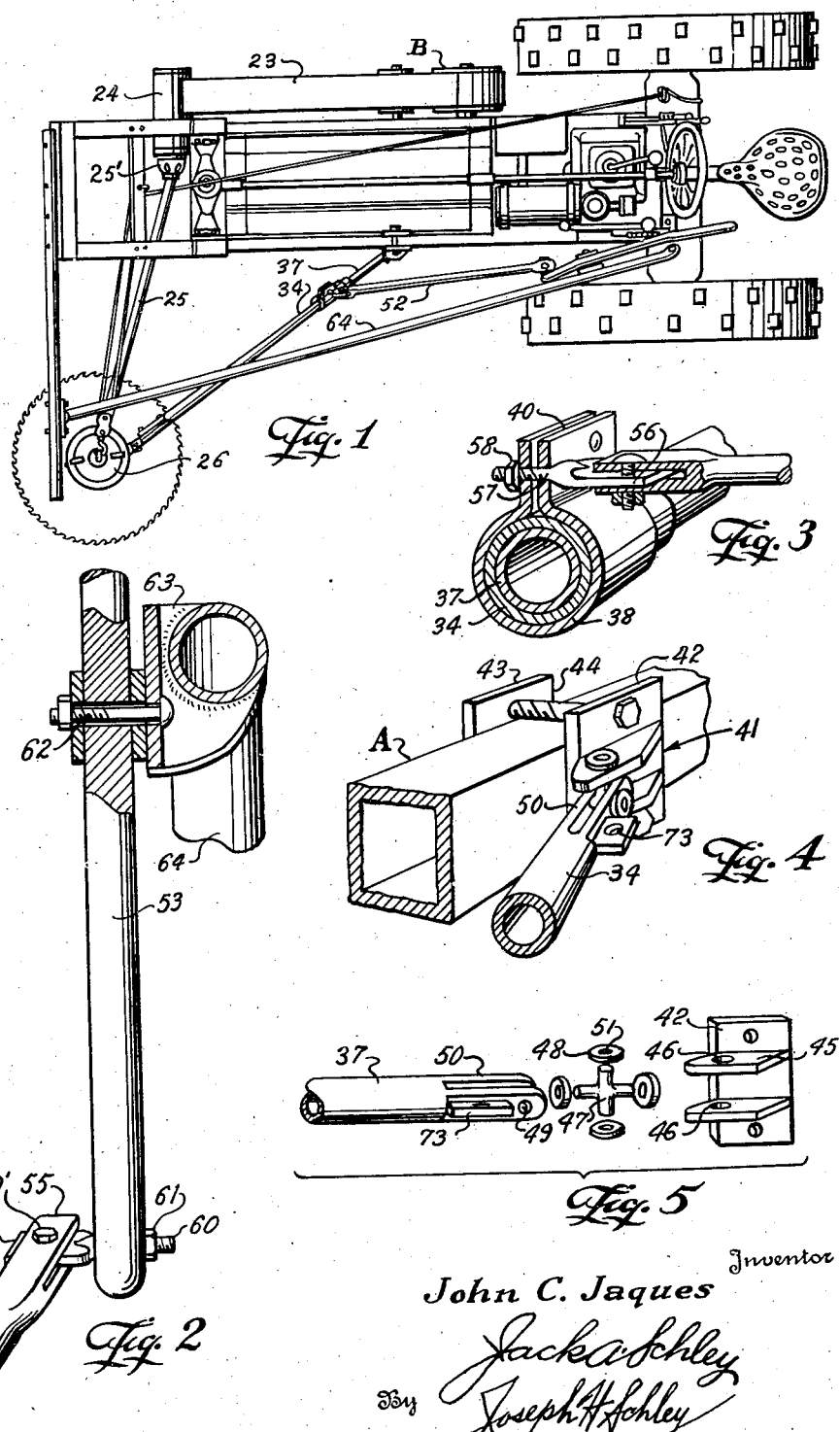

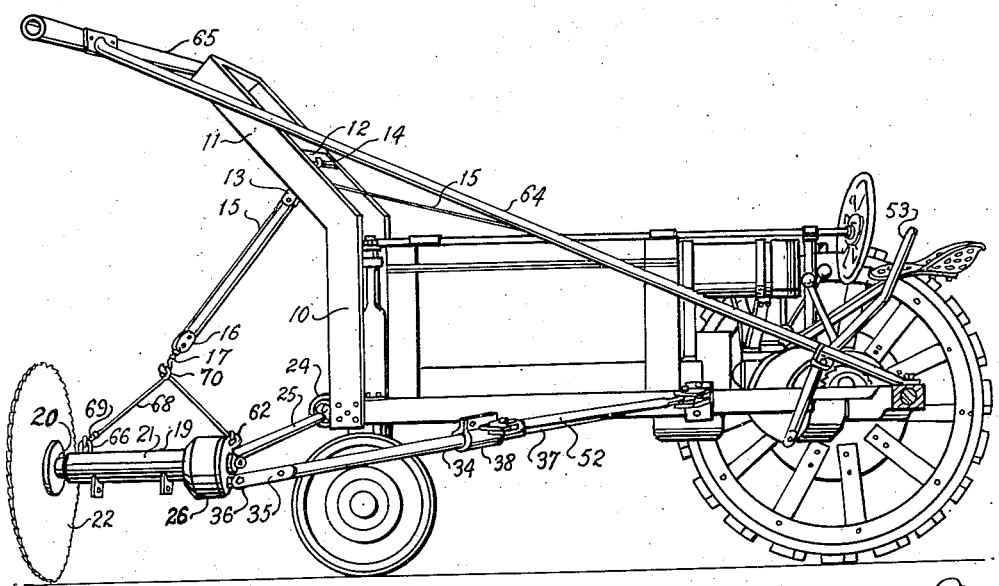
Fig. 9
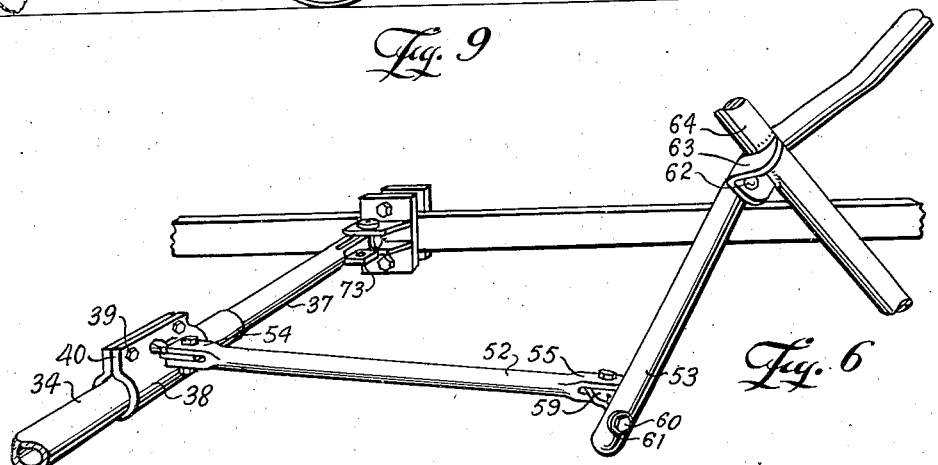
Fig. 6
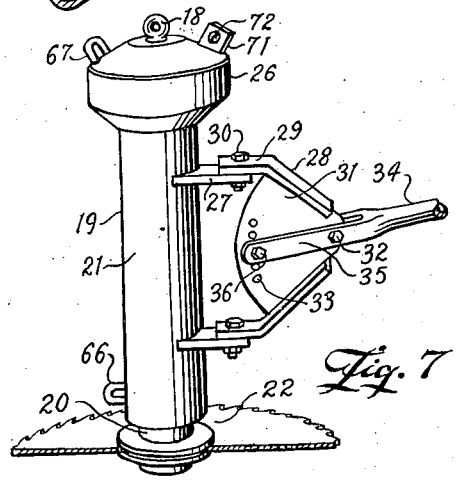
Fig. 7
Fig. 8
Inventor
John C. Jaques
By Jack A. Schley
Joseph H. Schley
Attorneys Patented Nov. 26, 1946

UNITED STATES PATENT OFFICE 2,411,624

MOBILE SAW

John C. Jaques, Denison, Tex.

Application March 9, 1945, Serial No. 581,728

7 Claims. (Cl. 143—43)

This invention relates to new and useful improvements in mobile saws.

One object of the invention is to provide an improved mobile saw which is adapted to be attached to an ordinary tractor without alteration in the construction of such tractor and whereby the saw may be readily adjusted and controlled by the driver while manipulating the tractor.

Another object of the invention is to provide a relatively simple mobile saw capable of various cutting positions and having very flexible means for adjusting, positioning and feeding the saw to the work.

An important object of the invention is to provide an improved mobile saw adapted to be attached to and driven by an ordinary tractor involving a saw head having a circular saw and a triangular brace and adjusting mechanism, whereby the saw head is positioned, sustained in position and driven.

A particular object of the invention is to provide a saw head for a mobile saw and suspending means therefor, involving means whereby the working position of the head may be changed, as from vertical to horizontal, and the saw driven and fed to the work or sustained in operating position.

A further object of the invention is to provide a saw head capable of various positions and adjustments together with a unique form of swinging and bracing means.

Still another object of the invention is to provide an improved means for swinging and feeding the saw which may be readily operated and controlled by the driver of the tractor.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a plan view of a tractor equipped with a mobile saw constructed in accordance with the invention, Fig. 2 is a detail, partly in elevation and partly in section of the lever mechanism, Fig. 3 is a sectional detail of the boom shackle and connections, Fig. 4 is an isometric view of the hanger, Fig. 5 is a composite view of the hanger and swivel connections, Fig. 6 is a perspective view of a portion of the lever and boom mechanism, Fig. 7 is an elevation of the saw head and boom connection, Fig. 8 is a vertical sectional view of the boom bracket, and Fig. 9 is a side elevation of a tractor with the saw head mounted for upright cutting.

In the drawings, the numeral 10 designates an upright frame or support adapted to be fastened on the front end of the generally rectangular frame A (Fig. 4) of an ordinary farm tractor. This frame, which is rectangular in elevation and which may be suitably fabricated in any suitable manner, is secured across the front end of the tractor frame by any suitable fastening means. The upper portion of the frame 10 is inclined forwardly to provide a hanger 11 which overhangs the area immediately in front of the tractor. A cross member or brace bar 12 is secured transversely in the medial section of the hanger. It is pointed out that the frame may be mounted on the front of an ordinary tractor without reconstructing or altering the construction of such tractor.

An upper pulley block 13 is suitably secured to the cross bar 12 and has attached thereto, a cable 15 passing down and through a lower pulley block 16, thence upward and through the upper block. From the upper block the cable extends rearwardly to a suitable lever (not shown) which may be mounted on the rear of the tractor frame; such levers being common on farm tractors. The lower pulley block is provided with a hook 17 which is adapted to engage an eye 18 (Fig. 7) in the top of a saw head 19. A vertical saw shaft 20 extends from the bottom of a cylindrical housing 21 forming part of the head. A circular saw 22 is suitably fastened on the lower end of said shaft. It is obvious that by adjusting the cable 15, the saw head and the saw may be raised or lowered to cut at various elevations.

The driving mechanism for the saw is incidental to the invention herein set forth and is subject to variation. For the purposes of illustration, I have shown substantially the same mechanism as is set forth in my co-pending application, Serial No. 553,311, filed September 9, 1944. This mechanism includes in general an endless belt 23 (Fig. 1) having one end passing around and driven by the power take-off pulley B of the tractor; while its other end is supported by and drives a housed pulley 24 having connection with a universal joint 25' from which a shaft 25 extends. This shaft is connected at its outer end with a differential 26 mounted on the housing 21 of the saw head 19, whereby the saw shaft 20 is rotated.

The saw 22 is disposed at one side and is usually supported to cut in advance of the tractor frame. The invention has particularly to do with the positioning and maintenance of the saw in cutting positions to which it is adjusted. Vertically spaced lugs 27, integral with the housing 21, project horizontally therefrom at the medial portion thereof. A yoke-shaped upright bracket 28 has ears 29 overlapping and pivoted on the lugs by means of bolts 30. The bracket has a sector-shaped web 31 carrying a pivot bolt 32 at its outer reduced end and a series of holes 33, concentric to the pivot bolt, adjacent its inner arcuate edge (Figs. 7 and 8).

A boom 34 is provided at its outer end with a bifurcated head 35 receiving the web of the bracket and pivoted thereto on the bolt 32. The outer end of the head is secured by a bolt 36 passing through one of the holes 33. By changing the bolt 36 to other holes 33, the angular relationship between the boom and the saw head 19 may be varied. The boom has a shank 37 telescoping its inner end at a point inwardly from a shackle 38 clamped around said boom by means of bolts 39 passing through its flanges 40 (Fig. 6).

A hanger 41, including an upright thrust plate 42 and an upright bridle plate 43, is clamped on one of the side rails of the tractor frame A by twin bolts 44 extending through the plates, immediately above and below said rail (Fig. 4). The thrust plate has a pair of vertically spaced, outwardly directed wings 45, each provided with openings 46 (Fig. 5). A swivel cross 47, disposed uprightly between the wings, has its vertical arms extending through the openings and receiving retaining collars 48, whereby the cross is pivoted to swing horizontally between the wings. The collars may be welded or otherwise fastened on the ends of the cross arms. The horizontal arms of the cross pass through openings 49 in a bifurcated swivel head 50 and are pivotally confined by collars 51, like the collars 48. The head 50 is suitably secured to the shank 37 and the inner end of the boom 34 is thus swiveled in the hanger 41.

The boom functions to swing the saw head 19 and the saw 22 in a generally horizontal plane. If it is desired to tilt or incline the saw, it is merely necessary to adjust the bolt 36 by which the bracket 28 is attached to the saw head. It will be observed from Fig. 1 that the shaft 25 and the boom 34 form a triangular brace for the saw head 19, one leg of said triangular brace being adjustable in length by reason of the telescoping shank 37. This permits the saw head to be swung forwardly or rearwardly; also to be raised and lowered by reason of the pivotal connections at the inner ends of the shaft and the boom.

For swinging the saw as well as for holding the head in positions to which it is swung, a lever mechanism is provided which includes a link 52 and a hand lever 53. See Fig. 9. The link has bifurcated heads 54 and 55, at its forward and rear ends, respectively. The head 54 pivotally receives the flattened head 56 of a bolt 57 (Fig. 3) swiveled in the flanges 40 of the shackle 38 and retained by a nut 58. The rear head 55 receives the flattened head 59 (Fig. 2) of a bolt 60 swiveled in the lower end of the lever 53 and confined by a nut 61. The head is pivoted to the bolt head by a bolt 59'. The lever is pivoted intermediate its ends on a bolt 62 carried by an angular bracket 63 (Figs. 2 and 6) welded to a strut 64 (Figs. 1, 2 and 6). When the hand lever, which is adjacent the driver's seat, is swung, the boom 34 is likewise swung. This lever is employed not only to swing the saw, but to feed it into the work as the sawing progresses.

A horizontal spar or push bar 65 having one end bolted across the top of the hanger 11, overhangs advancing side of the saw 22 slightly ahead of the saw head 19. The bar is braced by the strut 64 which has its rear end fastened to the rear of the tractor frame A and is inclined upwardly and forwardly to the bar 65, to which it is suitably secured.

When the apparatus is used for cutting a tree or other upright objects, the tractor is under sufficient propulsion to cause the bar 65 to exert pressure against the tree and cause the latter to lean away from the tractor and the saw, thus freeing the saw and impelling the tree to fall beyond the tractor.

In using the saw to cut trees, it is desirable that the bolt 36 of the bracket 28 be engaged in one of the holes 33 (Fig. 7), whereby the saw head 19 is slightly tilted from the perpendicular so as to slightly depress the advance or cutting sector of the saw and elevate the rear or opposite sector, thus the tree is cut at such an angle as to induce it to fall away from the saw and tractor. The upper end of the lever 53 being within easy reach of the driver, may be swung by him, thus swinging its lower end and the link 52, forwardly. By keeping the lever under pressure, the boom 34 is swung forwardly, thereby feeding the saw into the tree as the cutting advances. The saw may be used for cutting underbrush, as well as grass and weeds.

When it is desired to use the saw in an upright position for sawing felled timber or other uses, the saw head 19 is disconnected and mounted as is shown in Fig. 9. Near the bottom of the housing 21, an eye 66, diametrically opposite the lugs 27, extends from said housing. A second eye 67 projects from the differential 26 and overhangs the eye 66. The lugs 27 are disconnected from the bracket 28 and the head 19 is then turned to a horizontal position. The hook 17 is also disengaged from the eye 18. Bridle links 68 are provided with hooks 69 at their lower ends and these hooks are engaged in the eyes 66 and 67. Each link has an eye 70 at its upper end which is engaged with the hook 17 of the lower block 16, whereby a sling is provided for suspending the saw head.

A lug 71 (Fig. 7) having an aperture 72 formed integral with the differential 26, on the opposite side of the eye 18 from the eye 66, is employed to connect the saw head with boom 34. The bolt 36 in the end of the head 35 is passed through the aperture 72 of the lug 71. As is shown in Figs. 4 and 6, the head 50 of the shank 37 of the boom 34, is provided with an ear 73.

By loosening the bolts 44, the hanger 41 may be adjusted longitudinally of the side rail of the tractor frame A. The shank 37 has sufficient length to permit a considerable extension, thus removing the bolt 59' from the bolt head 59 and swinging the link 52, the rear head thereof may be engaged with the ear 73 and secured in place by the bolt 59'. The link will thus extend along the side of the boom 34 and its shank, thus converting it from a telescoping, to a rigid boom. When the saw head 19 has been swung to the desired position, by sliding the hanger 41, then the bolts 44 are tightened to secure the parts in position. The lever 53 is left idle.

It is pointed out that with the saw head 19 in the positions shown in Figs. 1 and 7, the link 52 may be disconnected from the lever 53 and secured to the ear 73 of the boom shank 37. This will produce in co-action with the shaft 25, a rigid triangular brace for the saw head. Such an arrangement is used for cutting grass. Very satisfactory results have been obtained by using a circular saw 60 inches in diameter. The teeth of the saw are of course subject to variation, but what would be called a "coarse" or "heavy tooth" saw has been used for cutting trees, underbrush, wild grass, weeds and the like, without change of saws. However, smaller saws and saws with various types and sizes of teeth may be used. By mounting the saw head 19 and saw 22 at one side and in advance of the tractor the work is always ahead and to one side of the tractor, whereby the driver may not only clearly observe the cutting, but may also handle the saw and the tractor to the best advantage.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A mobile saw adapted to be mounted on a tractor including, an upright support adapted to be mounted on the forward end of the tractor frame, a saw unit including a saw head having saw rotating means and a circular saw connected to said means, a substantially V-shaped brace connected at its apex to the saw unit and swingably connected at the opposite ends to the tractor frame and including means for driving the saw rotating means, one leg of said brace being adjustable lengthwise, means carried by the upright support and connected to the saw unit for adjustably supporting the latter, and manually operable means adapted to be mounted on the tractor and connected with the adjustable leg of the brace for adjusting said leg and thereby the saw unit to positions forward and rearward of the upright support.

2. A mobile saw as set forth in claim 1, and a push bar carried by the upright support and extending laterally thereof above the saw unit.

3. A mobile saw adapted to be mounted on a tractor including, an upright support adapted to be mounted on the forward end of the tractor frame, a saw unit including a saw head having saw rotating means and a saw shaft connected thereto, a tubular shank inclosing the saw shaft, a circular saw connected to the saw shaft and rotatable thereby, a pair of laterally extending ears on said shank, a yoke pivoted to the ears, a substantially V-shaped brace including a drive shaft connected from the tractor frame to the saw head and an elongate member adjustable lengthwise and having one end pivoted to the tractor frame and the other end secured to the yoke, means on the yoke for detachably securing the brace member in different angular positions with respect to the yoke so as to vary the angular position of the saw with respect to the tractor frame, means carried by the upright support and connected to the saw unit for adjustably supporting the latter, and manually operable means adapted to be mounted on the tractor and connected with the adjustable elongate member of the brace for adjusting said member and thereby the saw unit to positions forward and rearward of the upright support.

4. A mobile saw adapted to be mounted on a tractor including, an upright support adapted to be mounted on the forward end of the tractor frame, a saw unit including a saw head having saw rotating means and a saw shaft connected thereto, a tubular shank inclosing the saw shaft, a circular saw connected to the saw shaft and rotatable thereby, a substantially V-shaped brace connected at its apex to the saw unit and swingably connected at the opposite ends to the tractor frame and including means for driving the saw rotating means, one leg of said brace being adjustable lengthwise, a bridle having one end connected to the saw head and the other to the saw end of the tubular shank, means carried by the upright support and connected to the bridle for adjustably supporting the saw unit, and manually operable means adapted to be mounted on the tractor and connected with the adjustable leg of the brace for adjusting said leg and thereby the saw unit to positions forward and rearward of the upright support.

5. A mobile saw adapted to be mounted on a tractor including, an upright support adapted to be mounted on the forward end of the tractor frame, a saw unit including a saw head having saw rotating means and a circular saw connected to said means, a substantially V-shaped brace connected at its apex to the saw unit and swingably connected at the opposite ends to the tractor frame and including means for driving the saw rotating means, one leg of said brace being formed of two telescoping sections so as to be adjustable lengthwise, means carried by the upright support and connected to the saw unit for adjustably supporting the latter, manually operable means adapted to be mounted on the tractor and having a link connected at its forward end with the outer section of the adjustable leg of the brace for adjusting said leg and thereby the saw unit to positions forward and rearward of the upright support, and means carried by the inner end of the inner one of said telescoping sections to which the rearward end of said link is connectable, so as to prevent telescopic movement of the said sections to thereby convert the adjustable leg of the brace to a fixed leg to brace the saw unit in a fixed position.

6. A mobile saw adapted to be mounted on a tractor including, an upright support adapted to be mounted on the forward end of the tractor frame, a saw unit including a saw head having saw rotating means and a saw shaft connected thereto, a tubular shank inclosing the saw shaft, a circular saw connected to the saw shaft and rotatable thereby, a plate pivoted to the shank and carrying a plurality of openings, a substantially V-shaped brace including a drive shaft connected from the tractor frame to the saw head and an elongate member adjustable lengthwise and having one end pivoted to the tractor frame, means for securing the opposite end of the member to said plate selectively in said openings in different angular positions with respect to the plate so as to vary the angular position of the saw with respect to the tractor frame, means carried by the upright support and connected to the saw unit for adjustably supporting the latter, and manually operable means adapted to be mounted on the tractor and connected with the adjustable member of the brace for adjusting said member and thereby the saw unit to positions forward and rearward of the upright support.

7. A mobile saw in accordance with the construction as set forth in claim 1, wherein the saw unit supporting means and the saw unit are provided with cooperating parts for selectively positioning the saw unit and thereby the saw in horizontal and vertical planes.

JOHN C. JAQUES.